(12) United States Patent
Kvist

(10) Patent No.: US 12,466,280 B2
(45) Date of Patent: Nov. 11, 2025

(54) WORKING MACHINE

(71) Applicant: VOLVO CONSTRUCTION EQUIPMENT AB, Eskilstuna (SE)

(72) Inventor: Roland Kvist, Braås (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 599 days.

(21) Appl. No.: 17/968,103

(22) Filed: Oct. 18, 2022

(65) Prior Publication Data

US 2023/0144575 A1 May 11, 2023

(30) Foreign Application Priority Data

Nov. 9, 2021 (EP) ..................................... 21207212

(51) Int. Cl.
*H02J 7/00* (2006.01)
*B60L 5/00* (2006.01)
(Continued)

(52) U.S. Cl.
CPC .................. *B60L 53/36* (2019.02); *B60L 5/00* (2013.01); *B60L 53/12* (2019.02); *B60L 53/14* (2019.02);
(Continued)

(58) Field of Classification Search
CPC .......... B60L 53/36; B60L 53/12; B60L 53/14; B60L 53/16; B60L 53/30; B60L 53/38;
(Continued)

(56) References Cited

U.S. PATENT DOCUMENTS

| 2010/0307846 | A1 | 12/2010 | Kvist |
| 2015/0283907 | A1* | 10/2015 | Huber .................... B60L 50/40 191/50 |

(Continued)

FOREIGN PATENT DOCUMENTS

| CN | 101970256 A | 2/2011 |
| CN | 109789806 A | 5/2019 |

(Continued)

OTHER PUBLICATIONS

Office Action for Chinese Patent Application No. 202211353766.9 dated May 30, 2025, 5 pages.

(Continued)

*Primary Examiner* — Zixuan Zhou
(74) *Attorney, Agent, or Firm* — Sage Patent Group

(57) ABSTRACT

A working machine is provided, comprising a working machine frame structure, at least one electric machine configured to propel the working machine, a re-chargeable energy storage system electrically connected to the at least one electric machine, the at least one electric machine being operable by electric power received from the re-chargeable energy storage system, a load implement body configured to receive a load and being pivotably connected to the working machine frame structure at a pivot joint, and an electrical charge element electrically connected to the re-chargeable energy storage system, the electrical charge element being arranged on a surface portion of the load implement body and configured to, in a charging state, receive electric power from a vertically elevated power source, wherein the working machine is configured to bring the electrical charge element into the charging state by rotation of the load implement body around the pivot joint.

15 Claims, 3 Drawing Sheets

(51) Int. Cl.
*B60L 53/12* (2019.01)
*B60L 53/14* (2019.01)
*B60L 53/16* (2019.01)
*B60L 53/30* (2019.01)
*B60L 53/36* (2019.01)
*B60L 53/38* (2019.01)
*H02J 50/10* (2016.01)

(52) U.S. Cl.
CPC ............... *B60L 53/16* (2019.02); *B60L 53/30* (2019.02); *B60L 53/38* (2019.02); *H02J 50/10* (2016.02); *B60L 2200/40* (2013.01); *B60L 2260/32* (2013.01)

(58) Field of Classification Search
CPC .... B60L 2200/40; B60L 2260/32; B60L 5/00; H02J 50/10
USPC .............................................. 320/109; 701/22
See application file for complete search history.

(56) References Cited

U.S. PATENT DOCUMENTS

2017/0163073 A1* 6/2017 Neander ................. B60L 53/12
2021/0108392 A1 4/2021 Hahn et al.

FOREIGN PATENT DOCUMENTS

| CN | 111684134 A | 9/2020 |
| EP | 2399768 A2 | 12/2011 |
| EP | 2962890 B1 | 5/2016 |

OTHER PUBLICATIONS

Extended European Search Report for European Patent Application No. 21207212.8 mailed May 9, 2022, 8 pages.

* cited by examiner

WORKING MACHINE

CROSS REFERENCE TO RELATED APPLICATIONS

This application claims foreign priority to European patent application No. 21207212.8 filed on Nov. 9, 2021, the disclosure and content of which is incorporated by reference herein in its entirety.

TECHNICAL FIELD

The present invention relates to a working machine. In particular, the working machine comprises at least one electric traction motor for propelling the vehicle, wherein charging of a re-chargeable energy storage system is achieved by raising a load implement body of the working machine. Although the invention will mainly be directed to a working machine in the form of a dump truck, the invention may also be applicable for other types of working machines at least partially propelled by an electric traction motor, such as e.g., an excavator, an articulated hauler provided with a tiltable body, etc.

BACKGROUND

The propulsion systems of working machines are continuously developed to meet the demands from the market. A particular aspect relates to the emission of environmentally harmful exhaust gas. Therefore, working machines propelled by electric machines receiving electric power from a re-chargeable energy storage system, e.g., a battery has been increasingly popular.

The re-chargeable energy storage system is however in need of charging at regular intervals when operating the working machine. The working machine thus needs to be driven to a charging station for charging of the energy storage system.

US 2015/0283907 describes a charging system of a working machine. The charging system in US 2015/0283907 is formed by a pantograph arranged on the dump body and is raised to be in contact with an overhead trolley line when charging the battery of the working machine.

However, the solution described by US 2015/0283907 involves the addition of an expensive component for charging. Also, the pantograph needs to be separately controlled by a control system of the vehicle, thereby requiring additional control strategies for proper functionality.

It is therefore a desire to simplify the charging of working machines, which is also less expensive and requires a lower number of additional components.

SUMMARY

It is thus an object of the present invention to at least partially overcome the above described deficiencies.

According to a first aspect, there is provided a working machine, comprising a working machine frame structure, at least one electric machine configured to propel the working machine, a re-chargeable energy storage system electrically connected to the at least one electric machine, wherein the at least one electric machine is operable by electric power received from the re-chargeable energy storage system, a load implement body configured to receive a load, the load implement body being pivotably connected to the working machine frame structure at a pivot joint, and an electrical charge element electrically connected to the re-chargeable energy storage system, the electrical charge element being arranged on a surface portion of the load implement body and configured to, in a charging state, receive electric power from a vertically elevated power source, wherein the working machine is configured to bring the electrical charge element into the charging state by rotation of the load implement body around the pivot joint.

The wording "load implement body" should be construed as a body of the working machine which is able to receive and carry load. The load implement body should be able to be lifted from a lower position to an upper, elevated position in which the electrical charge element is arranged in the charging state. As defined above, the load implement body is pivotably connected to the working machine frame structure. According to an example embodiment, the working machine may be a dump truck of which the load implement body is a dump body. Other alternatives are also conceivable, such as a working machine in the form of an excavator. In the latter example, the load implement body preferably comprises an excavator bucket.

The electrical charge element is an element which is able to receive electric power from the power source, and configured to transmit the electric power to the re-chargeable energy storage system. The electrical charge element is preferably electrically insulated to the load implement body for preventing electric power to be transmitted into the load implement body. Further, the re-chargeable energy storage system is arranged to receive electric power, i.e. be charged, and to transmit the electric power to the at least one traction motor of the vehicle for propulsion thereof.

Moreover, bringing the electrical charge element into the charging state may be executed by a control unit connected to the load implement body. Hereby, the working machine receives a signal indicative of a desire to charge the re-chargeable energy storage system, and controls the load implement body to rotate the load implement body around the pivot joint for lifting at least a portion of the load implement body to the elevated position, and thus in turn lift the electrical charge element to receive electric power from the vertically elevated power source.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The present invention is based on the insight that electric charging of the re-chargeable energy storage system can be performed without the use of any additional mechanisms such as e.g., a pantograph. To put it differently, the present invention uses the implement to operate as a pantograph. Hence, electric charging is performed by already existing components of the working machine, with the slight addition of the electrical charge element. Also, charging can by the present invention be performed with conventional vertically elevated power sources, also commonly referred to as charging poles, or automatic charging poles. Accordingly, the invention is applicable for vertically elevated power sources which are also configured to supply electric power to vehicles using a pantograph. A further advantage is thus also that the overall cost for implementing the charging infrastructure in the working machine is reduced.

Furthermore, the vertically elevated power source may be positioned at an unloading position of a work site. In such a situation, the working machine can unload material from the load implement body while simultaneously charging the re-chargeable energy storage system. In other words, the material is unloaded at the same time as the re-chargeable energy storage system is charged with electric power.

According to an example embodiment, the electrical charge element may be arranged stationary on the surface portion of the load implement body when the load implement body rotates around the pivot joint. Accordingly, when the load implement body moves up and/or down, the electrical charge element follows motion of the load implement body.

According to an example embodiment, the surface portion may have a surface normal facing away from the working machine frame structure. In other words, the surface normal faces the vertically elevated power source.

According to an example embodiment, the surface portion of the load implement body may be arranged on a vertical upper portion of the load implement body. Hereby, only a simple and convenient motion of the load implement body is necessary to bring the electrical charge element into the charging state.

According to an example embodiment, the surface portion of the load implement body may be arranged on a longitudinally opposite side of the load implement body in comparison to the pivot joint. Accordingly, the charging element is preferably arranged at an outer position of a lever arm formed by the load implement body thereby ensuring that the electrical charge element, and no other portions of the load implement body will accidentally contact the vertically elevated power source.

According to an example embodiment, the electrical charge element may be a conductive charge element. According to an example embodiment, the conductive charge element may be configured to be brought into the charging state by mechanically connect conductive charge element with the vertically elevated power source. A conductive charge element is advantageous as it conducts electric power with a high utilization ratio.

According to an example embodiment, the electrical charge element may be an inductive charge segment. According to an example embodiment, the inductive charge element may be configured to be brought into the charging state by position the inductive charge element in the vicinity of the vertically elevated power source. An advantage is that the electrical charge element is not in need of being in physical contact with the vertically elevated power source. Hereby, wear of components, i.e., the electrical charge element as well as the vertically elevated power source is reduced.

According to an example embodiment, the load implement body may be configured to transition between a first state in which a longitudinal extension of the load implement body is parallel with the longitudinal extension of the working machine frame structure, and a second state in which the longitudinal extension of the load implement body is inclined relative to the longitudinal extension of the working machine frame structure.

According to an example embodiment, the load implement body may be configured to transition between the first and second states by rotation of the load implement body around the pivot joint. According to an example embodiment, the working machine may be a dump truck. The transition between the first and second states is thus executed in the same manner as when unloading material from the load implement body, i.e., when unloading material from the dump body of the dump truck. When the working machine is e.g., an excavator, the transition between the first and second states is executed by raising the excavator bucket. Accordingly, and according to an example embodiment, the electrical charge element may be brought into the charging state when the load implement body assumes the second state.

According to an example embodiment, the second state may define a maximum allowable inclination between the load implement body and the working machine frame structure.

According to an example embodiment, the working machine may be an autonomously controlled working machine.

The autonomously controlled working machine may thus be operated from an operator command station of the work site, or be pre-programmed to follow a route for performing the operations at the work site, etc.

According to an example embodiment, the working machine may further comprise a control unit connected to the re-chargeable energy storage system and to an autonomously controlled steering system of the working machine, the control unit comprising control circuitry configured to receive a signal indicative of state of charge level of the re-chargeable energy storage system, compare the state of charge level with a predetermined threshold limit, and control the autonomously controlled steering system to operate the working machine to a charging station comprising a vertically elevated power source when the state of charge level is below the predetermined threshold limit, and control the load implement body to rotate around the pivot joint to bring the electrical charge element into the charging state when arriving at the charging station.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
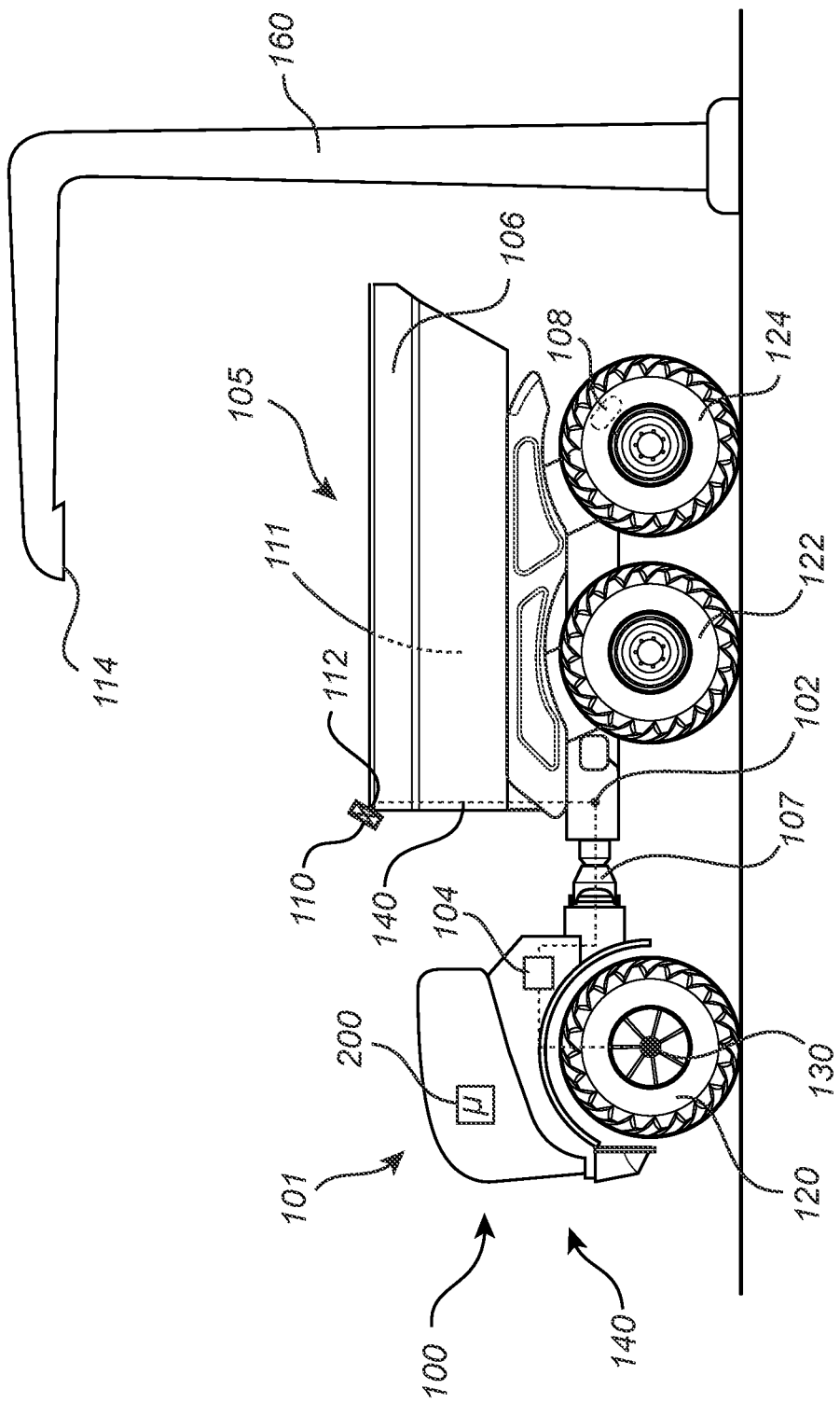
FIG. 1 is a lateral side view illustrating an example embodiment of a working machine in the form of a dump truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a working machine 100. The exemplified working machine 100 of FIG. 1 is a dump truck 101. In yet further detail, the dump truck 101 in FIG. 1 comprises a front unit 103 and a rear unit 105, where the front 103 and rear 105 units are connected to each other by an articulation joint 107. The dump truck 101 in FIG. 1 may thus also be referred to as an articulated dump truck, or an articulated hauler. The dump truck may however equally as well be arranged in the form of a fixed hauler where the front 103 and rear 105 units are fixed to each other. The working machine 100 is preferably operated at a working site, in particular a confined working site in the below described example when the working machine 100 is an autonomously controlled working machine 100.

The front unit 103 comprises a pair of steerable wheels 120, while the rear unit 105 comprises a pair of frontmost rear wheels 122 and a pair of rearmost rear wheels 124. The pair of steerable wheels 120 of the front unit 103 are connected to an electric machine 130 arranged to propel the working machine 100. Although not depicted in FIG. 1, the pair of frontmost rear wheels 122 and/or the pair of rearmost rear wheels 124 may, as an alternative or as a complement, be provided with an electric machine for propulsion. Hence, the working machine 100 may be two-wheel driven, four-wheel driven and/or six-wheel driven. However, the following will only describe the working machine 100 with the electric machine 130 arranged on the steerable wheels 120 of the front unit 103. Further, the working machine 100 also comprises a re-chargeable energy storage system 104 electrically connected to the electric machine 130 for supply of electric power to the electric machine 130. The re-chargeable energy storage system 104 is preferably arranged in the form of a vehicle battery and is in FIG. 1 exemplified as arranged on the front unit 103.

Further, the rear unit 105 comprises a working machine frame structure 102 carrying a load implement body 106. The load implement body 106 is in FIG. 1 exemplifies as a dump body 105 of the dump truck 101. The load implement body 106 comprises an open box structure 111 configured to receive a load. The specific type of load may of course vary depending on the application of use, but can be e.g. mud, sand, rocks, gravel, etc. The load implement body 106 is pivotably connected to the working machine frame structure 102 at a pivot joint 108 of the working machine frame structure 102. The pivot joint 108 is arranged at a longitudinal rear end of the working machine 100, pivotably connecting a rear end of the load implement body 106 to a rear end of the rear unit 105 to each other. The load implement body 106 is thus pivotable around a geometric axis extending laterally of the working machine 100. The load implement body 106 is also connected to the working machine frame structure 102 at a longitudinal front end by an extendible and retractable cylinder, which is illustrated in further detail in FIG. 2.

Moreover, the working machine 100 comprises an electrical charge element 110. The electrical charge element 110 is electrically connected to the re-chargeable energy storage system 104 by means of electric wiring 140. The electrical charge element 110 is thus an electrical contact point serving as an interface between the re-chargeable energy storage system 104 and a power source 114 of a charging station 160, which charging station power source is configured to, when connected to the electrical charge element 110, charge/re-charge the re-chargeable energy storage system 104.

As can be seen in FIG. 1, the electrical charge element 110 is arranged on the load implement body 106. In further detail, the electrical charge element 110 is arranged on a surface portion 112 arranged on a vertical upper portion of the load implement body and on a longitudinally opposite side of the load implement body 106 in comparison to the pivot joint 108. Preferably, the electrical charge element 110 is electrically isolated from the load implement body 106. Thus, when the electrical charge element 110 receives electric power from the power source 114 as will be described in further detail below with reference to FIG. 2, electric power is prevented from being transmitted into the load implement body 106. The electrical insulation may be obtained by using an electrically isolating material for connecting the electrical charge element 110 to the surface portion 112 of the load implement body 106. As an alternative, the surface portion 112 of the load implement body 106 may by itself be formed by an isolating material.

Furthermore, the electrical charge element 110 is arranged stationary on the surface portion 112 relative to the load implement body 106 and has a surface normal facing away from the working machine frame structure 102. Hence, the surface normal of the electrical charge element 110 is facing substantially vertically upwards and moves upwards and downwards by the upward and downward motion of the load implement body 106.

Moreover, the working machine also comprises a control unit 200. The working machine 100 is preferably an autonomously controlled working machine and the control unit 200 is, as will be described further below, configured to operate the vehicle, i.e., navigate the working machine, and control the operation of the electric machine 130. The control unit 200 is also connected to the re-chargeable energy storage system 104 for determining e.g., the state-of-charge level of the re-chargeable energy storage system 104. The control unit 200 is also configured to control the load implement body which will be described below.

The working machine 100 depicted in FIG. 1 is thus arranged in a state where the load implement body 106 is positioned in a load receiving state. Hence, when the load implement body 106 is arranged in this state, the cylinder connecting the longitudinal front end of the load implement body 106 to the working machine frame structure 102 is retracted, and the load implement body 106 can receive material. Also, when the load implement body 106 is positioned in a load receiving state, the working machine 100 is allowed to be propelled and operated at the working site.

Figure 2:
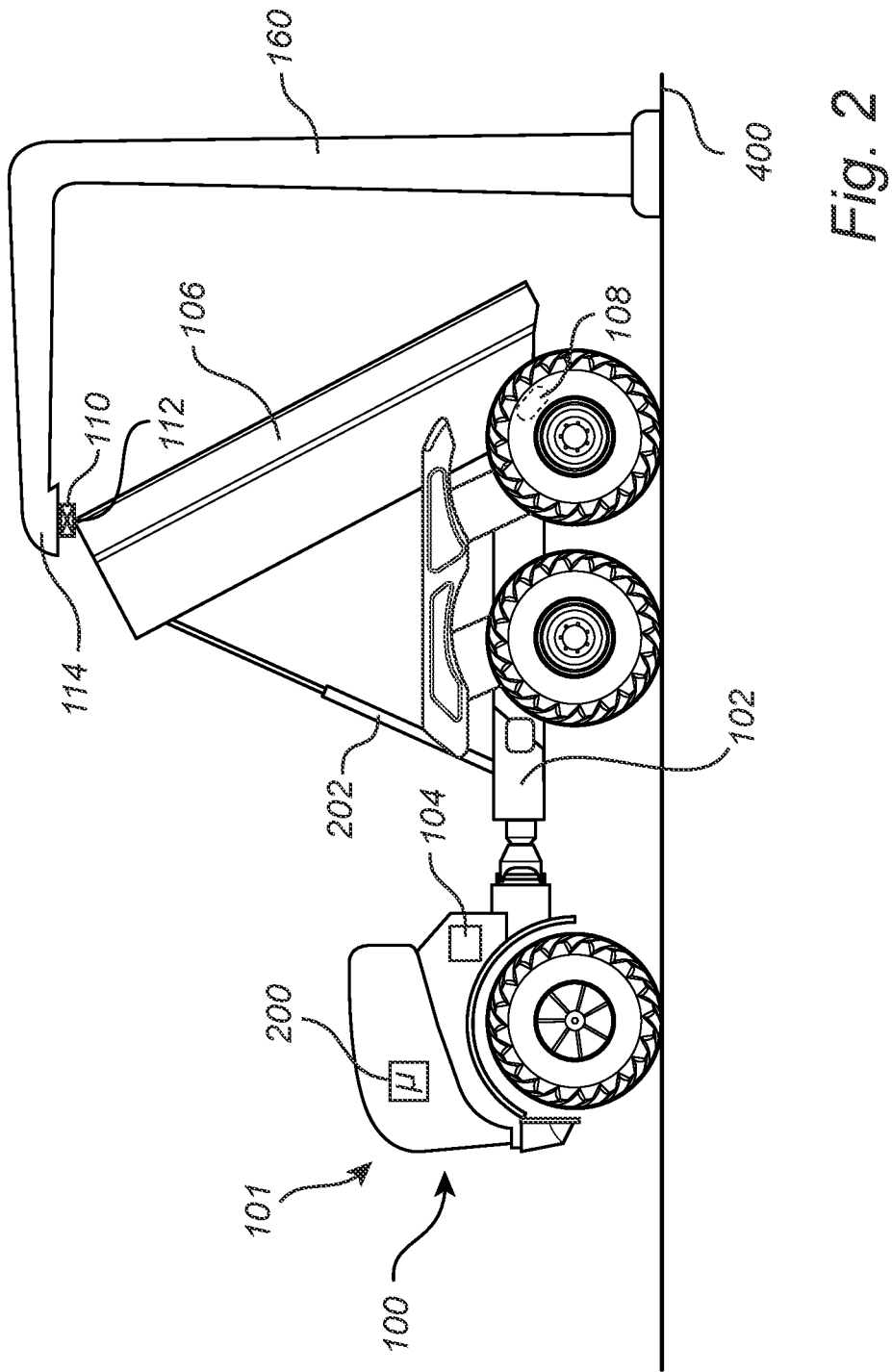
FIG. 2 is a lateral side view of the FIG. 1 working machine during charging of the re-chargeable energy storage system according to an example embodiment.

In order to describe charging/re-charging of the re-chargeable energy storage system 110 of the present invention in further detail, reference is made to FIG. 2. FIG. 2 is a lateral side view of the FIG. 1 working machine 100 during charging of the re-chargeable energy storage system according to an example embodiment. In FIG. 2, the electric wiring between the electrical charge element 110 and the re-chargeable energy storage system 104 has been omitted but should of course be construed as forming part of the working machine also for FIG. 2.

As can be seen in FIG. 2, the power source 114 is a vertically elevated power source 114. Thus, the power source 114 is thus vertically elevated relative to ground level 400. According to the exemplified embodiment depicted in the figures of the present disclosure, the vertically elevated power source 114 is arranged on a pole 160 attached to the ground level 400 and extending vertically from the ground level 400.

When the re-chargeable energy storage system 104 in in need of charging, which may e.g., be determined by the control unit 200 receiving a signal indicative of a state-of-charge level of the re-chargeable energy storage system 104 falling below a predetermined threshold limit, the working machine 100 is operated to a position in the vicinity of the pole 160. The control unit 114 thereafter controls the load implement body 106 to tilt around the pivot joint 108. In particular, the control unit 200 controls the cylinder 202 to raise the front end of the load implement body 106. The load implement body 106 is rotated around the pivot joint 108 until the electrical charge elements is brought into a charging state, in which charging state the electrical charge element receives electric power from the vertically elevated power source 114.

According to a non-limiting example embodiment, the electrical charge element is a conductive charge element. In such a case, the electric charge element is brought into the charging state by mechanically connect conductive charge element with the vertically elevated power source. However, the electrical charge element may as an alternative be an inductive charge segment. In such a case, the electric charge element is brought into the charging state by positioning the inductive charge element in the vicinity of the vertically elevated power source. The wording "in the vicinity of" should be construed as a distance where electric power is able to be transmitted from the vertically elevated power source to the inductive charge element.

In yet further detail, when charging of the re-chargeable energy storage system is to be carried out, the control unit 200 controls the load implement body 106 to transition from a first state in which a longitudinal extension of the load implement body 106 is parallel with the longitudinal extension of the working machine frame structure 102, to a second state in which the longitudinal extension of the load implement body 106 is inclined relative to the longitudinal extension of the working machine frame structure 102, which inclination is achieved by rotating the load implement body 106 around the pivot joint 108.

Preferably, the second state, i.e., when the electrical charge element is brought into the charging state, preferably defines a maximum allowable inclination of the pivot joint. The second state thus preferably corresponds to the same position of the load implement body 106 as when unloading material at the working site.

Figure 3:
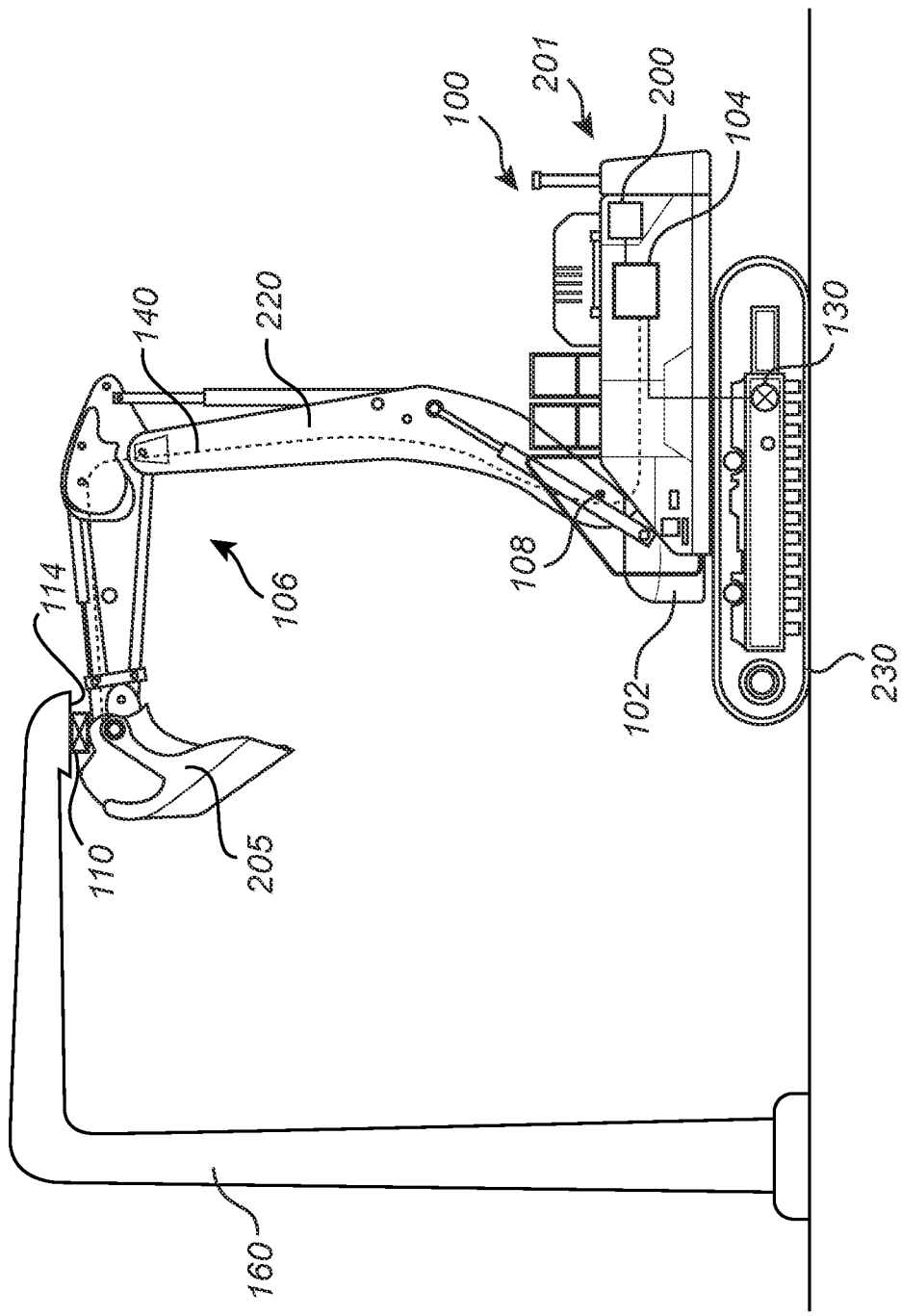
FIG. 3 is a lateral side view of a working machine in the form of an excavator according to an example embodiment.

In order to describe a further working machine 100 forming part of the present invention, reference is made to FIG. 3. FIG. 3 is a lateral side view of a working machine 100 in the form of an excavator 201 according to an example embodiment.

In a similar vein as the above described dump truck 101 depicted in FIGS. 1 and 2, the excavator 201 also comprises a schematically illustrated electric machine 130 for propelling the excavator 201. The electric machine 130 is connected to ground engaging members in the form of continuous tracks 230. Furthermore, the excavator 201 also comprises a re-chargeable energy storage system 104 electrically connected electric machine 130, as well as a control unit 200 for controlling operation of the excavator 201.

Moreover, the excavator 201 comprises a load implement body 106. The load implement body 106 comprises a bucket 205. The bucket 205 is connected to a boom 220, which in turn is pivotably connected to a frame structure 102 of the excavator 201 at a pivot joint 108. Thus, the load implement body 106 should thus be construed as comprising both the bucket 205 as well as the boom 220.

Moreover, the excavator 201 comprises an electrical charge element 110. The electrical charge element 110 is arranged on the bucket 205 and electrically connected to the re-chargeable energy storage system 104 by means of electric wiring 140 arranged along the boom 220.

Charging of the re-chargeable energy storage system 104 of the excavator 201 is executed in a similar manner as for the dump truck 101 described above in relation to FIGS. 1 and 2. In particular, when charging the re-chargeable energy storage system 104, the electric charge element 110 is brought into the charging state, in which charging state the electrical charge element 110 receives electric power from the vertically elevated power source 114. In yet further detail, the electrical charge element 110 is brought into the charging state by rotating the load implement body 106, and in particular the boom 220, around the pivot joint 108 until electric power can be transmitted between the vertically elevated power source 114 and the electrical charge element 110.

Furthermore, and as indicated above, the working machines 100 depicted in FIGS. 1-3 are preferably autonomously controlled working machines. This is particularly depicted in FIGS. 1-2, where the working machine 100 lacks an operator cabin. The control unit 200 is thus preferably connected to an autonomously controlled steering system of the working machine 100. The control unit 200 comprising control circuitry which during autonomously controlled operation of the vehicle is configured to receive a signal indicative of state of charge level of the re-chargeable energy storage system. The control circuit compares the state of charge level with a predetermined threshold limit. When the state of charge level is below the predetermined threshold limit, there is a need/desire to re-charge the re-chargeable energy storage system. The control circuit hereby controls the autonomously controlled steering system to operate the working machine to a charging station comprising the above described vertically elevated power source 114.

When arriving at the charging station, the control circuitry controls the load implement body 106 to rotate around the pivot joint 108 to bring the electrical charge element 110 into the above described charging state. The re-chargeable energy storage system 104 is hereby charge by electric power from the charging station.

It is to be understood that the present disclosure is not limited to the embodiments described above and illustrated in the drawings; rather, the skilled person will recognize that many changes and modifications may be made within the scope of the appended claims.

The invention claimed is:

1. A working machine, comprising
a working machine frame structure;
at least one electric machine configured to propel the working machine;
a re-chargeable energy storage system electrically connected to the at least one electric machine, wherein the at least one electric machine is operable by electric power received from the re-chargeable energy storage system;

a load implement body configured to receive a load, the load implement body being pivotably connected to the working machine frame structure at a pivot joint; and an electrical charge element electrically connected to the re-chargeable energy storage system, the electrical charge element being arranged on a surface portion of the load implement body and configured to, in a charging state, receive electric power from a vertically elevated power source, wherein the working machine is configured to bring the electrical charge element into the charging state by rotation of the load implement body around the pivot joint.

2. The working machine according to claim 1, wherein the electrical charge element is arranged stationary on the surface portion of the load implement body when the load implement body rotates around the pivot joint.

3. The working machine according to claim 1, wherein the surface portion has a surface normal facing away from the working machine frame structure.

4. The working machine according to claim 1, wherein the surface portion of the load implement body is arranged on a vertical upper portion of the load implement body.

5. The working machine according to claim 1, wherein the surface portion of the load implement body is arranged on a longitudinally opposite side of the load implement body in comparison to the pivot joint.

6. The working machine according to claim 1, wherein the electrical charge element is a conductive charge element.

7. The working machine according to claim 6, wherein the conductive charge element is configured to be brought into the charging state by mechanically connect conductive charge element with the vertically elevated power source.

8. The working machine according to claim 1, wherein the electrical charge element is an inductive charge segment.

9. The working machine according to claim 8, wherein the inductive charge element is configured to be brought into the charging state by position the inductive charge element in the vicinity of the vertically elevated power source.

10. The working machine according to claim 1, wherein the load implement body is configured to transition between a first state in which a longitudinal extension of the load implement body is parallel with the longitudinal extension of the working machine frame structure, and a second state in which the longitudinal extension of the load implement body is inclined relative to the longitudinal extension of the working machine frame structure.

11. The working machine according to claim 10, wherein the load implement body is configured to transition between the first and second states by rotation of the load implement body around the pivot joint.

12. The working machine according to claim 10, wherein the second state defines a maximum allowable inclination between the load implement body and the working machine frame structure.

13. The working machine according to claim 10, wherein the electrical charge element is brought into the charging state when the load implement body assumes the second state.

14. The working machine according to claim 1, wherein the working machine is an autonomously controlled working machine.

15. The working machine according to claim 14, further comprising a control unit connected to the re-chargeable energy storage system and to an autonomously controlled steering system of the working machine, the control unit comprising control circuitry configured to:

receive a signal indicative of state of charge level of the re-chargeable energy storage system;

compare the state of charge level with a predetermined threshold limit;

control the autonomously controlled steering system to operate the working machine to a charging station comprising a vertically elevated power source when the state of charge level is below the predetermined threshold limit; and control the load implement body to rotate around the pivot joint to bring the electrical charge element into the charging state when arriving at the charging station.

* * * * *